(12) United States Patent
Ukuma

(10) Patent No.: US 7,558,047 B2
(45) Date of Patent: Jul. 7, 2009

(54) ELECTRONIC COMPONENT AND METHOD FOR PRODUCING THE SAME

(75) Inventor: Yuji Ukuma, Echizen (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 389 days.

(21) Appl. No.: 10/568,441

(22) PCT Filed: Feb. 14, 2005

(86) PCT No.: PCT/JP2005/002173
§ 371 (c)(1),
(2), (4) Date: Feb. 15, 2006

(87) PCT Pub. No.: WO2005/104148
PCT Pub. Date: Nov. 3, 2005

(65) Prior Publication Data
US 2008/0063877 A1    Mar. 13, 2008

(30) Foreign Application Priority Data
Apr. 23, 2004   (JP) .............................. 2004-128224

(51) Int. Cl.
*H01G 4/008* (2006.01)
*H01G 2/20* (2006.01)
(52) U.S. Cl. .................. 361/305; 361/308.1; 361/309; 361/310
(58) Field of Classification Search ...... 361/306.1–313, 361/305, 209; 252/514
See application file for complete search history.

(56) References Cited

U.S. PATENT DOCUMENTS

| | | | | |
|---|---|---|---|---|
| 3,612,963 A | * | 10/1971 | Piper et al. | 361/321.3 |
| 4,029,605 A | * | 6/1977 | Kosiorek | 252/514 |
| 5,561,587 A | * | 10/1996 | Sanada | 361/306.1 |
| 6,295,196 B1 | * | 9/2001 | Hamaji et al. | 361/321.2 |

(Continued)

FOREIGN PATENT DOCUMENTS

JP       57-148331        9/1982

(Continued)

OTHER PUBLICATIONS

International Search Report from corresponding International Application—mailed Jun. 7, 2005.

(Continued)

*Primary Examiner*—Cathy Lam
(74) *Attorney, Agent, or Firm*—Dickstein Shapiro LLP

(57) ABSTRACT

An electronic component is provided which includes external electrodes having a multilayer structure of first and second sintered electrode layers that are densely sintered and have less possibility of causing poor appearance and decreased reliability in electrical connection. Each external electrode includes a first sintered electrode layer and a second sintered electrode layer. The first sintered electrode layer contains a first borosilicate glass containing an alkali metal in which there is 85% to 95% by weight of silicon and 0.5% to 1.5% by weight of the alkali metal based on 100% by weight of all contained elements other than boron. The second sintered electrode layer contains a second borosilicate glass containing an alkali metal in which there is 65% to 80% by weight of silicon and 3.5% to 8.0% by weight of the alkali metal based on 100% by weight of all contained elements other than boron.

11 Claims, 1 Drawing Sheet

U.S. PATENT DOCUMENTS

| | | | |
|---|---|---|---|
| 6,346,497 B1 * | 2/2002 | Nakamura et al. | 501/138 |
| 6,522,521 B2 * | 2/2003 | Mizuno et al. | 361/321.4 |
| 6,620,753 B2 * | 9/2003 | Nakamura et al. | 501/137 |
| 6,663,798 B2 * | 12/2003 | Sato et al. | 252/512 |
| 6,930,876 B1 * | 8/2005 | Noguchi et al. | 361/311 |
| 7,285,232 B2 * | 10/2007 | Miki | 252/514 |
| 7,393,586 B2 * | 7/2008 | Okada et al. | 428/403 |
| 7,397,649 B2 * | 7/2008 | Muto et al. | 361/321.4 |

FOREIGN PATENT DOCUMENTS

| | | |
|---|---|---|
| JP | 2-109314 | 4/1990 |
| JP | 4-273417 | 9/1992 |
| JP | 6-93307 | 4/1994 |
| JP | 6-349314 | 12/1994 |
| JP | 2001-93326 | 4/2001 |
| JP | 2001-345231 | 12/2001 |
| JP | 2002-158137 | 5/2002 |
| JP | 2003-338218 | 11/2003 |

OTHER PUBLICATIONS

Written Opinion from corresponding International Application—mailed Jun. 7, 2005.

* cited by examiner

ELECTRONIC COMPONENT AND METHOD FOR PRODUCING THE SAME

TECHNICAL FIELD

The present invention relates to electronic components including an electronic component body and external electrodes formed on outer surfaces thereof and methods for producing the electronic components. More specifically, the present invention relates to an electronic component including external electrodes having a multilayer structure of sintered electrode layers and a method for producing the electronic component.

BACKGROUND ART

In the production of electronic components such as monolithic ceramic capacitors, conventionally, an electronic component body is prepared before external electrodes are formed on outer surfaces thereof. External electrodes of this type are often composed of a sintered electrode layer that is formed by baking a conductive paste and is, for example, plated with Sn.

On the other hand, the mounting of electronic components on, for example, printed circuit boards using a conductive adhesive instead of solder has recently attracted attention as a lead-free mounting method. When an electronic component is mounted on, for example, a printed circuit board with a conductive adhesive, external electrodes are bonded with the conductive adhesive. If the surfaces of the external electrodes are made of, for example, Sn plating, they tend to oxidize during heat treatment for curing the conductive adhesive. Such external electrodes disadvantageously exhibit increased contact resistance and decreased reliability in electrical connection.

Patent Document 1 below discloses an electronic component having external electrodes including laminated sintered electrode layers instead of Sn plating. Specifically, the multilayer ceramic electronic component according to Patent Document 1 includes a ceramic laminate having internal electrodes made of Ni or a Ni alloy and external electrodes formed at both end surfaces of the ceramic laminate. The external electrodes each include a first sintered electrode layer mainly containing Cu or a Cu alloy and a second sintered electrode layer mainly containing Ag or a Ag alloy. According to this publication, the external electrodes are formed by applying a first conductive paste containing Cu or a Cu alloy and a glass frit, applying thereto a second conductive paste containing a metal powder mainly containing Ag or a Ag—Pd alloy and a glass frit, and simultaneously baking the first and second conductive pastes at 700° C.

Patent Document 1: Japanese Unexamined Patent Application Publication No. 2002-158137

DISCLOSURE OF INVENTION

According to the method disclosed in Patent Document 1, the external electrodes have a multilayer structure of the first and second sintered electrode layers. In particular, the outer layers, the second sintered electrode layers, mainly contain Ag or a Ag alloy. The external electrodes are therefore resistant to oxidation so that they are suitable for mounting with a conductive adhesive.

The metal mainly contained in the first sintered electrode layers, Cu or a Cu alloy, has a relatively high sintering temperature compared to the metal mainly contained in the second sintered electrode layers, Ag or a Ag alloy. If the first and second sintered electrode layers are formed by co-firing, the difference in sintering temperature between the metals mainly contained makes it extremely difficult to control the sintering temperature and the atmosphere in practice. If, therefore, the external electrodes are formed by co-firing, either the first sintered electrode layers or the second sintered electrode layers disadvantageously tend to exhibit insufficient densities and decreased reliability.

An object of the present invention is to overcome the drawbacks of the above related art and provide a highly reliable electronic component having external electrodes including laminated first and second sintered electrode layers with sufficient densities and a method for producing the electronic component.

Another object of the present invention is to provide an electronic component having external electrodes that are resistant to oxidation and thus suitable for mounting with a conductive adhesive and a method for producing the electronic component.

The present invention provides an electronic component including an electronic component body and external electrodes formed thereon. The external electrodes each include a first sintered electrode layer and a second sintered electrode layer disposed thereon. The first and second sintered electrode layers mainly contain different metals. The first sintered electrode layer contains a first borosilicate glass containing an alkali metal. The first borosilicate glass contains 85% to 95% by weight of silicon and 0.5% to 1.5% by weight of the alkali metal based on 100% by weight of all contained elements other than boron according to analysis with a wavelength dispersive X-ray microanalyzer. The second sintered electrode layer contains a second borosilicate glass containing an alkali metal. The second borosilicate glass contains 65% to 80% by weight of silicon and 3.5% to 8.0% by weight of the alkali metal based on 100% by weight of all contained elements other than boron according to analysis with a wavelength dispersive X-ray microanalyzer.

In a particular aspect of the electronic component according to the present invention, the alkali metal contained in the first borosilicate glass is potassium, and the alkali metal contained in the second borosilicate glass is sodium.

In another particular aspect of the electronic component according to the present invention, the metal mainly contained in the second sintered electrode layer is a noble metal. The noble metal used is preferably silver-palladium.

In another particular aspect of the electronic component according to the present invention, the electronic component body includes internal electrodes, and the metal mainly contained in the first sintered electrode layer is a metal that is alloyed with the internal electrodes. In a more specific aspect of the electronic component according to the present invention, the internal electrodes mainly contain nickel, and the metal that is alloyed with the internal electrodes is copper.

In another particular aspect of the electronic component according to the present invention, the external electrodes of the electronic component are to be connected to patterned electrodes on a mounting substrate with a conductive adhesive prepared by dispersing a metal filler in a resin.

The present invention further provides a method for producing an electronic component including an electronic component body and external electrodes formed thereon. The external electrodes each include a first sintered electrode layer and a second sintered electrode layer disposed thereon. The first and second sintered electrode layers mainly contain different metals. The method includes the steps of forming the first sintered electrode layer by applying to the electronic component body a first conductive paste containing a first metal, as a main component, and a first borosilicate glass that contains an alkali metal and has a first softening temperature and sintering the first conductive paste at a first sintering temperature higher than the first softening temperature; and forming the second sintered electrode layer by applying to the first sintered electrode layer a second conductive paste containing a second metal different from the first metal and a second borosilicate glass that contains an alkali metal and has a second softening temperature lower than the first softening temperature and sintering the second conductive paste at a second sintering temperature lower than the first softening temperature and higher than the second softening temperature.

In a particular aspect of the method for producing the electronic component according to the present invention, the second metal is sintered at the second sintering temperature, which is lower than the melting temperature of the second metal, using the second borosilicate glass, and the second sintering temperature is lower than the first softening temperature by at least 50° C.

In another particular aspect of the method for producing the electronic component according to the present invention, the first metal is sintered at the first sintering temperature, which is lower than the melting temperature of the first metal, using the first borosilicate glass. In addition, the second metal is sintered at the second sintering temperature, which is lower than the melting temperature of the second metal, using the second borosilicate glass. Furthermore, the decrease in the second sintering temperature relative to the melting temperature of the second metal is larger than the decrease in the first sintering temperature relative to the melting temperature of the first metal.

In another particular aspect of the method for producing the electronic component according to the present invention, the alkali metal contained in the first borosilicate glass is potassium, and the alkali metal contained in the second borosilicate glass is sodium.

In another particular aspect of the method for producing the electronic component according to the present invention, the second metal is a noble metal. The noble metal used is preferably silver-palladium.

In another particular aspect of the method for producing the electronic component according to the present invention, the electronic component body includes internal electrodes, and the first metal is a metal that is alloyed with the internal electrodes.

In another particular aspect of the method for producing the electronic component according to the present invention, the internal electrodes mainly contain nickel, and the metal that is alloyed with the internal electrodes is copper.

The electronic component according to the present invention includes the electronic component body, on which the first and second sintered electrode layers are provided to form the external electrodes. The first sintered electrode layer contains the first metal and the first borosilicate glass containing an alkali metal. The first borosilicate glass contains 85% to 95% by weight of silicon and 0.5% to 1.5% by weight of the alkali metal based on 100% by weight of all contained elements other than boron according to analysis with a wavelength dispersive X-ray microanalyzer. On the other hand, the second sintered electrode layer contains the second metal, which is different from the first metal, and the second borosilicate glass containing an alkali metal. The second borosilicate glass contains 65% to 80% by weight of silicon and 3.5% to 8.0% by weight of the alkali metal based on 100% by weight of all contained elements other than boron according to analysis with a wavelength dispersive X-ray microanalyzer.

Accordingly, the second softening point of the second borosilicate glass contained in the second sintered electrode layer is lower than the first softening point of the first borosilicate glass contained in the first sintered electrode layer. If, therefore, the first sintered electrode layer and the second sintered electrode layer are separately sintered in that order, the second sintered electrode layer can be formed with a relatively low second sintering temperature. Thus, the first borosilicate glass contained in the first sintered electrode layer does not soften in the sintering of the second sintered electrode layer. The first borosilicate glass does not soften even if the first sintered electrode layer is densely formed under sufficient sintering conditions before the formation of the second sintered electrode layer. This allows the formation of external electrodes including dense first and second sintered electrode layers.

The present invention can therefore enhance the reliability of external electrodes including first and second sintered electrode layers effectively.

If the alkali metals contained in the first and second borosilicate glasses are potassium and sodium, respectively, the second softening point of the second borosilicate glass, which contains sodium, is reliably decreased to less than the first softening point of the first borosilicate glass.

If the metal mainly contained in the second sintered electrode layer is a noble metal such as Ag or a Ag alloy, the surfaces of the external electrodes are resistant to oxidation because of the oxidation resistance of the noble metal. The present invention can therefore provide an electronic component suitable for mounting with a conductive adhesive. If, particularly, the noble metal used is silver-palladium, the external electrodes can have excellent conductivity and oxidation resistance.

If the electronic component body includes internal electrodes and the metal mainly contained in the first sintered electrode layer is a metal that is alloyed with the internal electrodes, the metal can enhance the reliability of the electronic connection between the first sintered electrode layer and the internal electrodes and the adhesion strength therebetween.

If the internal electrodes mainly contain nickel and the metal that is alloyed with the internal electrodes is copper, the two metals can be alloyed to enhance the reliability of the electronic connection between the first sintered electrode layer and the internal electrodes and the adhesion strength therebetween.

If the external electrodes of the electronic component are connected to patterned electrodes on a mounting substrate with a conductive adhesive prepared by dispersing a metal filler in a resin, the external electrodes can be reliably connected to the patterned electrodes with the conductive adhesive. Unlike Sn plating, for example, the external electrodes have excellent oxidation resistance because they include the second sintered electrode layer outside.

The method for producing the electronic component according to the present invention includes forming the first sintered electrode layer by applying to the electronic component body a first conductive paste containing a first metal and a first borosilicate glass having a first softening temperature and sintering the first conductive paste at a first sintering temperature higher than the first softening temperature; and forming the second sintered electrode layer by applying to the first sintered electrode layer a second conductive paste containing a second metal, as a main component, and a second borosilicate glass having a second softening temperature lower than the first softening temperature and sintering the second conductive paste at a second sintering temperature lower than the first softening temperature and higher than the second softening temperature. Accordingly, the control of temperature and atmosphere is easier than in the co-firing of the first and second sintered electrode layers. This method can also increase the densities of the first and second sintered electrode layers.

The method according to Patent Document 1, as described above, has difficulty in controlling the temperature and atmosphere for sintering in practice because the first and second sintered electrode layers are formed by co-firing. This method therefore has difficulty in densely forming both first and second sintered electrode layers.

In the method according to the present invention, on the other hand, the first and second sintered electrode layers are sintered in different steps. These layers can therefore be densely formed by independently controlling the atmospheres in the individual sintering steps.

In the method according to the present invention, additionally, the second sintering temperature in the formation of the second sintered electrode layer is lower than the first softening temperature and higher than the second softening temperature. The step of forming the second sintered electrode layer therefore does not soften the first borosilicate glass contained in the first sintered electrode layer, which has been previously sintered. As a result, defects such as the deformation of the glass contained in the first sintered electrode layer hardly occur after the formation of the second sintered electrode layer. This method can thus reliably provide an electronic component with higher reliability.

If the second metal is sintered at the second sintering temperature, which is lower than the melting temperature of the second metal, using the second borosilicate glass and the second sintering temperature is lower than the first softening temperature by at least 50° C., the external electrodes of the electronic component according to the present invention can have less possibility of causing defects.

If the first metal is sintered at the first sintering temperature, which is lower than the melting temperature of the first metal, using the first borosilicate glass, the second metal is sintered at the second sintering temperature, which is lower than the melting temperature of the second metal, using the second borosilicate glass, and the decrease in the second sintering temperature relative to the melting temperature of the second metal is larger than the decrease in the first sintering temperature relative to the melting temperature of the first metal, the first sintered electrode layer can have less possibility of causing defects such as the deformation of the first borosilicate glass in the step of forming the second sintered electrode layer. The above conditions can also increase the densities of the first and second sintered electrode layers more effectively.

If the alkali metals contained in the first and second borosilicate glasses are potassium and sodium, respectively, the difference in the type of alkali metal contained contributes to the decrease in the second softening temperature of the second borosilicate glass.

If the second metal is a noble metal, the surfaces of the external electrodes are resistant to oxidation. The method according to the present invention can therefore provide an electronic component suitable for mounting with a conductive adhesive. If the metal used is silver-palladium, the external electrodes can have higher conductivity and oxidation resistance.

If the electronic component body includes internal electrodes and the first metal is a metal that is alloyed with the internal electrodes, the metal can enhance the reliability of the electronic connection between the external and internal electrodes and the mechanical adhesion strength therebetween. If, particularly, the internal electrodes mainly contain nickel and the metal that is alloyed with the internal electrodes is copper, the two metals can be reliably alloyed to enhance the reliability of the electronic connection between the external and internal electrodes effectively.

REFERENCE NUMERALS

Figure 1:
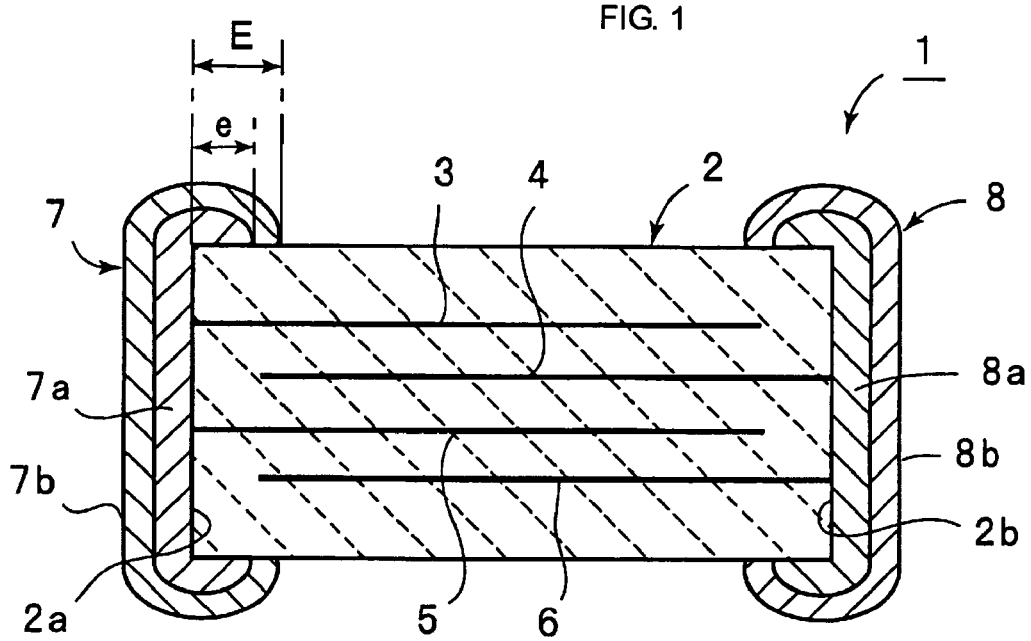
FIG. 1 is a front sectional view of a monolithic ceramic capacitor as an electronic component produced according to an embodiment of the present invention.

1: monolithic ceramic capacitor (electronic component)
2: sintered ceramic laminate
2a: first end surface
2b: second end surface
3 to 6: internal electrode
7 and 8: external electrode
7a and 8a: first sintered electrode layer
7b and 8b: second sintered electrode layer

BEST MODE FOR CARRYING OUT THE INVENTION

Specific embodiments of the present invention will now be described with reference to the drawings to clarify the invention.

FIG. 1 is a front sectional view of a monolithic ceramic capacitor as an electronic component according to an embodiment of the present invention. A monolithic ceramic capacitor 1 includes a sintered ceramic laminate 2 made of a suitable dielectric-ceramic material such as a barium-titanate-based ceramic material.

The sintered ceramic laminate 2 includes internal electrodes 3 to 6 facing each other with ceramic layers disposed therebetween. The internal electrodes 3 and 5 lead to a first end surface 2a of the sintered ceramic laminate 2 while the internal electrodes 4 and 6 lead to a second end surface 2b opposite the first end surface 2a.

In this embodiment, the internal electrodes 3 to 6 are formed by baking a conductive paste mainly containing Ni in the firing of the sintered ceramic laminate 2. The internal electrodes 3 to 6 therefore mainly contain Ni.

External electrodes 7 and 8 are formed so as to cover the end surfaces 2a and 2b, respectively. The external electrode 7 includes a first sintered electrode layer 7a and a second sintered electrode layer 7b formed thereon while the external electrode 8 includes a first sintered electrode layer 8a and a second sintered electrode layer 8b formed thereon. In this embodiment, the first sintered electrode layers 7a and 8a are formed by baking a conductive paste containing a Cu powder, as a main component metal, and a first borosilicate glass at a first sintering temperature.

The first borosilicate glass contains an alkali metal. According to analysis with a wavelength dispersive X-ray microanalyzer, the first borosilicate glass contains 85% to 95% by weight of silicon and 0.5% to 1.5% by weight of the alkali metal based on 100% by weight of the contained elements other than boron.

In this embodiment, on the other hand, the second sintered electrode layers 7b and 8b are formed by baking a conductive paste containing a Ag—Pd alloy powder, as a main component metal, and a second borosilicate glass at a second sintering temperature.

The second borosilicate glass contains an alkali metal. According to analysis with a wavelength dispersive X-ray microanalyzer, the second borosilicate glass contains 65% to 80% by weight of silicon and 3.5% to 8.0% by weight of the alkali metal based on 100% by weight of all contained elements other than boron.

Cu has a melting point of 1,083° C. while the Ag—Pd alloy used in this embodiment has a melting point of about 960° C. to 1,050° C. Because the second borosilicate glass contains a relatively large amount of alkali metal compared to that of the first borosilicate glass, the softening point of the second borosilicate glass, a second softening point, is lower than that of the first borosilicate glass, a first softening point. Specifically, the first softening point of the first borosilicate glass is about 760° C. to 810° C. while the second softening point of the second borosilicate glass is 580° C. to 630° C.

In the production of the monolithic ceramic capacitor 1 in this embodiment, therefore, the first sintered electrode layers 7a and 8a are formed at a first sintering temperature of about 860° C. to 910° C. while the second sintered electrode layers 7b and 8b are formed at a second sintering temperature of 680° C. to 730° C., which is lower than the first sintering temperature.

Using the first borosilicate glass, which has the first softening point, Cu is sintered at a first sintering temperature lower than the melting point of Cu and higher than the first softening point, namely 860° C. to 910° C., to densely form the first sintered electrode layers 7a and 8a. In addition, the first borosilicate glass contained in the first sintered electrode layers 7a and 8a does not soften in the formation of the second sintered electrode layers 7b and 8b because they are formed at a second sintering temperature of 680° C. to 730° C. Accordingly, the second sintered electrode layers 7b and 8b can be formed without softening the first borosilicate glass contained in the first sintered electrode layers 7a and 8a. Furthermore, because the second borosilicate glass has a second softening point of 580° C. to 630° C., the Ag—Pd alloy can be densely sintered at a temperature lower than the melting point of the alloy and higher than the second softening point.

Preferably, the second metal is sintered at the second sintering temperature, which is lower than the melting temperature of the second metal, using the second borosilicate glass, which has the second softening temperature, and the second sintering temperature is lower than the first softening temperature by at least 50° C. This ensures that the first borosilicate glass contained in the first sintered electrode layers does not soften in the formation of the second sintered electrode layers.

In the method according to this embodiment, the decrease in the second sintering temperature of the second sintered electrode layers 7b and 8b relative to the melting temperature of the Ag—Pd alloy contained in the second sintered electrode layers, namely 230° C. to 280° C., is larger than the decrease in the first sintering temperature of the first sintered electrode layers relative to the melting temperature of Cu, namely 173° C. to 223° C. The second sintered electrode layers can therefore be densely formed.

Figure 2:
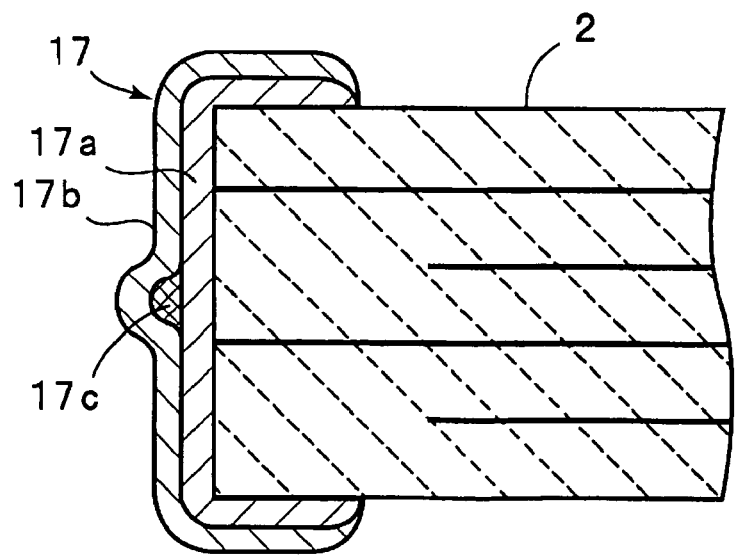
FIG. 2 is a partial front sectional view for illustrating problems occurring when a first borosilicate glass contained in a first sintered electrode layer softens in the baking of the second sintered electrode layer.

If the second sintering temperature is higher than the first softening point of the first borosilicate glass, the first borosilicate glass softens in the formation of the second sintered electrode layers 7b and 8b, thus causing, for example, a protuberance 17c shown in FIG. 2. FIG. 2 is a partial front sectional view for illustrating problems occurring when first and second sintered electrode layers are formed under conditions outside the scope of the present invention. In FIG. 2, first and second sintered electrode layers 17a and 17b are formed on an outer surface of the sintered ceramic laminate 2. The first sintered electrode layer 17a has the protuberance 17c, which is a portion softened and expanded in the formation of the second sintered electrode layers 17b. As a result of the protuberance 17c, the external electrode 17 has poor appearance and decreased reliability in the electrical connection between the first and second sintered electrode layers 17a and 17b.

In the method for producing the monolithic ceramic capacitor 1 according to this embodiment, on the other hand, the first and second sintered electrode layers are sequentially formed at the first and second sintering temperatures, respectively. Accordingly, as described above, the first sintered electrode layers 7a and 8a and the sintered electrode layers 7b and 8b can be densely sintered to provide a highly reliable monolithic ceramic capacitor 1. This point is demonstrated with specific experimental examples below.

Sintered ceramic laminates made of a barium-titanate-based ceramic material and having a length of 1.0 mm, a width of 0.5 mm, and a thickness of 0.5 mm were prepared as the sintered ceramic laminate 2. The sintered ceramic laminates each included about 50 internal electrode layers made of Ni.

The first sintered electrode layers 7a and 8a were formed so as to cover the end surfaces 2a and 2b, respectively, of each of the above sintered ceramic laminates 2 by applying and baking a Cu-containing conductive paste. The Cu-containing conductive paste used contained 100 parts by weight of Cu powder and 15 parts by weight of the first borosilicate glass. A solvent was added to the paste such that it had a solid content of 20% by volume. The first borosilicate glass used contained 90% by weight of silicon and 1.0% by weight of potassium, as an alkali metal, based on 100% by weight of all contained elements other than boron according to analysis with a wavelength dispersive X-ray microanalyzer after sintering. The first borosilicate glass had a glass softening point of 750° C.

The Cu conductive paste having the above composition was applied such that the thickness of the paste on the end surfaces 2a and 2b was 25 μm after drying and the length E of electrode-covered portions in FIG. 1 was 50 μm. Subsequently, the paste was baked in an oxygen atmosphere at an oxygen concentration of 0 to 5 ppm by keeping a maximum temperature of 850° C. for ten minutes to form the first sintered electrode layers 7a and 8a.

Next, conductive pastes containing a Ag—Pd alloy powder were prepared to form the second sintered electrode layers 7b and 8b. These conductive pastes contained a Ag—Pd alloy powder containing Ag and Pd at a ratio of 0.85:0.15 by weight, a second borosilicate glass, and a solvent. The content of the second borosilicate glass was 15 parts by weight based on 100 parts by weight of the Ag—Pd alloy powder. The solid content of the conductive pastes was 20% by volume.

Three borosilicate glasses having second softening points of 800° C., 750° C., and 600° C., respectively, were prepared as the above second borosilicate glass. According to analysis with a wavelength dispersive X-ray microanalyzer after baking, the three second borosilicate glasses had the following compositions.

(a) The second borosilicate glass having a softening point of 800° C. contained 90% by weight of silicon and 1.0% by weight of sodium, as an alkali metal, based on 100% by weight of all contained elements other than boron.

(b) The second borosilicate glass having a softening point of 750° C. contained 85% by weight of silicon and 2.5% by weight of sodium based on 100% by weight of all contained elements other than boron.

(c) The second borosilicate glass having a softening point of 600° C. contained 75% by weight of silicon and 5.0% by weight of sodium based on 100% by weight of all contained elements other than boron.

The Ag—Pd-containing conductive pastes were applied to the first sintered electrode layers 7a and 8a such that the thickness of the pastes above the end surfaces 2a and 2b was 30 μm after drying and the length E of electrode-covered portions was 250 μm.

The pastes were baked in an oxygen atmosphere at an oxygen concentration of 0 to 5 ppm by keeping a maximum temperature of 600° C., 700° C., 800° C., or 900° C. for ten minutes.

Thus, the second sintered electrode layers 7b and 8b were formed using the three second borosilicate glasses at the different sintering temperatures. The resultant monolithic ceramic capacitors were evaluated for poor appearance and reliability by the following methods.

(1) Poor appearance: The external electrodes were observed with a 3.5× stereoscopic microscope to check, for example, whether or not protuberances called blisters occurred on the surfaces of the external electrodes and whether or not they peeled off partially and determine the number of monolithic ceramic capacitors with poor appearance in 100 monolithic ceramic capacitors. The results are shown in Table 1.

(2) Reliability Evaluation

The insulation resistance logIR of the resultant monolithic ceramic capacitors was about 11. A humidity load test was carried out on 50 monolithic ceramic capacitors of each type by applying 1 W of power to the capacitors at 70° C. and a relative humidity of 95% for 500 hours. After the humidity load test, the insulation resistance logIR was measured, and monolithic ceramic capacitors with insulation resistances logIR below 6 were determined to be defective in terms of reliability. Table 1 below shows the numbers of monolithic ceramic capacitors determined to be defective in terms of reliability in the 50 monolithic ceramic capacitors.

reliability resulted when the second sintering temperature was lower than the second softening point of the second borosilicate glass.

In contrast, neither poor appearance nor low reliability resulted when the softening point of the first borosilicate glass used for the first sintered electrode layers 7a and 8a was higher than that of the second borosilicate glass used for the second sintered electrode layers; and the second sintering temperature was lower than the softening point of the first borosilicate glass and higher than the softening point of the second borosilicate glass.

In the above embodiment, the internal electrodes 3 to 6 are made of Ni, and the metal mainly contained in the first sintered electrode layers 7a and 8a is Cu. Ni and Cu, which are readily alloyed, can enhance the reliability of the electrical connection between the internal electrodes 3 to 6 and the sintered electrode layers 7a and 8a of the external electrodes 7 and 8 and the adhesion strength therebetween.

The metal mainly contained in the first sintered electrode layers 7a and 8a is Cu in this embodiment, though various metals other than Cu that are alloyed with Ni may also be used.

The internal electrodes may also be made of a metal other than Ni. In such a case, any metal that is alloyed with the metal used for the internal electrodes may be used as the metal mainly contained in the first sintered electrode layers.

The second sintered electrode layers 7b and 8b, which mainly contain a Ag—Pd alloy in the above embodiment, may contain another noble metal such as Ag. If the second sintered electrode layers 7b and 8b mainly contain a noble metal, their surfaces are resistant to oxidation so that they can be suitably used for electronic components to be mounted with a conductive adhesive. When an electronic component is mounted with a conductive adhesive prepared by adding a metal filler to a resin, the conductive adhesive is usually cured by heat treatment. The second sintered electrode layers 7b and 8b, which mainly contain a noble metal, are resistant to oxidation during such heat treatment, thus enhancing the reliability of the mounting structure using the conductive adhesive.

In the above embodiment, the alkali metal contained in the first borosilicate glass is potassium, and the alkali metal contained in the second borosilicate glass is sodium. The second borosilicate glass, which contains sodium, has a lower softening point than the first borosilicate glass, which contains potassium. Accordingly, the second sintering temperature in

TABLE 1

| Glass softening point of first layer | 750° C. | | | | | | | | | |
|---|---|---|---|---|---|---|---|---|---|---|
| Glass softening point of second layer | 800° C. | | | 750° C. | | | 600° C. | | | |
| Sintering temperature of second layer (° C.) | 900 | 800 | 700 | 900 | 800 | 700 | 900 | 800 | 700 | 600 |
| Number of capacitors with poor appearance | 70 | 40 | 0 | 100 | 40 | 0 | 100 | 30 | 0 | 0 |
| Number of capacitors with low reliability | 0 | 6 | 40 | 0 | 3 | 20 | 0 | 0 | 0 | 7 |

Table 1 shows that poor appearance resulted when the second sintering temperature in the baking of the second sintered electrode layers 7b and 8b was higher than the softening point of the first borosilicate glass used for the first sintered electrode layers 7a and 8a. On the other hand, low the baking of the second sintered electrode layers, which contain the second borosilicate glass, can be reliably lowered in the present invention. The alkali metals contained in the first and second sintered electrode layers are not limited to the combination of potassium and sodium.

In the above embodiment, the monolithic ceramic capacitor 1, which includes the internal electrodes, has been described, though the present invention may also be applied to other multilayer ceramic electronic components. In addition, electronic components according to the present invention do not necessarily include internal electrodes. That is, the present invention may also be applied to various electronic components, such as resisters, including an electronic component body having no internal electrodes, such as a resister chip, and external electrodes formed on outer surfaces of the body.

The invention claimed is:

1. An electronic component comprising an electronic component body having an external electrode thereon, the external electrode comprising a first sintered electrode layer and a second sintered electrode layer disposed thereon, the first and second sintered electrode layers comprising different metals, wherein
the first sintered electrode layer comprises a first borosilicate glass containing an alkali metal, the first borosilicate glass containing 85% to 95% by weight of silicon and 0.5% to 1.5% by weight of the alkali metal based on 100% by weight of all elements other than boron therein according to analysis with a wavelength dispersive X-ray microanalyzer; and
the second sintered electrode layer comprises a second borosilicate glass containing an alkali metal, the second borosilicate glass containing 65% to 80% by weight of silicon and 3.5% to 8.0% by weight of the alkali metal based on 100% by weight of all elements other than boron therein according to analysis with a wavelength dispersive X-ray microanalyzer.

2. The electronic component according to claim 1, wherein the alkali metal contained in the first borosilicate glass comprises potassium; and the alkali metal contained in the second borosilicate glass comprises sodium.

3. The electronic component according to claim 1, wherein the metal in the second sintered electrode layer comprises a noble metal.

4. The electronic component according to claim 3, wherein the noble metal comprises silver.

5. The electronic component according to claim 4, wherein the metal in the second sintered electrode layer comprises silver-palladium.

6. The electronic component according to claim 4, wherein the alkali metal contained in the first borosilicate glass comprises potassium; and the alkali metal contained in the second borosilicate glass comprises sodium.

7. The electronic component according to claim 1, wherein the electronic component body includes internal electrodes comprising a metal; and the metal of the first sintered electrode layer is a metal that is alloyed with the internal electrodes.

8. The electronic component according to claim 7, wherein the internal electrodes comprise nickel; and the metal that is alloyed with the internal electrodes comprises copper.

9. The electronic component according to claim 8, wherein the metal in the second sintered electrode layer comprises silver; the alkali metal contained in the first borosilicate glass comprises potassium; and the alkali metal contained in the second borosilicate glass comprises sodium.

10. The electronic component according to claim 1, wherein an external electrode of the electronic component is connected to an electrode on a mounting substrate with a conductive adhesive.

11. The electronic component according to claim 10, wherein the metal in the second sintered electrode layer comprises silver; the alkali metal contained in the first borosilicate glass comprises potassium; and the alkali metal contained in the second borosilicate glass comprises sodium.

* * * * *